(12) United States Patent
Medicus et al.

(10) Patent No.: US 8,553,231 B2
(45) Date of Patent: Oct. 8, 2013

(54) METHOD AND APPARATUS FOR DETERMINING THE HEIGHT OF A NUMBER OF SPATIAL POSITIONS ON A SAMPLE DEFINING A PROFILE OF A SURFACE THROUGH WHITE LIGHT INTERFEROMETRY

(75) Inventors: Katherine Mary Medicus, Tilburg (NL); Maarten Jozef Jansen, Casteren (NL)

(73) Assignee: Mitutoyo Corporation, Kawasaki (JP)

( * ) Notice: Subject to any disclaimer, the term of this patent is extended or adjusted under 35 U.S.C. 154(b) by 376 days.

(21) Appl. No.: 12/908,357

(22) Filed: Oct. 20, 2010

(65) Prior Publication Data

US 2011/0090511 A1     Apr. 21, 2011

(30) Foreign Application Priority Data

Oct. 20, 2009  (EP) .................... 09173518

(51) Int. Cl.
*G01B 11/02* (2006.01)

(52) U.S. Cl.
USPC .......................................... 356/511

(58) Field of Classification Search
USPC .................................. 356/479, 497, 511
See application file for complete search history.

(56) References Cited

U.S. PATENT DOCUMENTS

| 5,398,113 A | 3/1995 | de Groot |
| 5,633,715 A * | 5/1997 | Ai et al. ................ 356/497 |
| 6,493,093 B2 | 12/2002 | Harasaki et al. |
| 6,775,006 B2 | 8/2004 | Groot et al. |
| 2005/0157306 A1 | 7/2005 | Schmit et al. |
| 2009/0109444 A1 | 4/2009 | Wan |

OTHER PUBLICATIONS

Kino et al "Mirau correlation microscope" Applied Optics, vol. 29, No. 26, Sep. 10, 1990, pp. 3775-3783.*
Gordon S. Kino and Stanley S.C. Chim: "Mirau correlation microscope" Applied Optics, vol. 29, No. 26, Sep. 10, 1990, pp. 3775-3783, XP002570559.
Stanley S. C. Chim and Gordon S. Kino: "Three-dimensional image realization in interference microscopy" Applied Optics, vol. 31, No. 14, May 10, 1992, pp. 2550-2553, XP002570560.
Extended European Search report dated Mar. 3, 2010 issued in European Patent Application No. 09 17 3518.

* cited by examiner

*Primary Examiner* — Tarfur Chowdhury
*Assistant Examiner* — Jonathon Cook
(74) *Attorney, Agent, or Firm* — Rankin, Hill & Clark LLP

(57) ABSTRACT

The invention relates to a method and an apparatus for determining the height of a number of spatial positions on the sample, defining a height map of a surface through interferometry with a broadband light source. The method can involve for each spatial position: obtaining a correlogram during scanning of the surface plane of the objective and estimating the point of the correlogram where an amplitude of the correlogram is at its maximum, thus determining an approximation of the height of the spatial position on the sample. The estimation of the value where the correlogram has its maximum can involve subjecting the correlogram to a Fourier transform, subjecting the Fourier transformed signal to a filter, subjecting the filtered signal to an inverse Fourier transform, and calculating the location of the center of mass of the inversed filtered Fourier transformed signal.

15 Claims, 4 Drawing Sheets

METHOD AND APPARATUS FOR DETERMINING THE HEIGHT OF A NUMBER OF SPATIAL POSITIONS ON A SAMPLE DEFINING A PROFILE OF A SURFACE THROUGH WHITE LIGHT INTERFEROMETRY

TECHNICAL FIELD

The subject invention relates to white light interferometry in which a broadband light source is used to make a height map of an object. The invention further relates to an apparatus for determining the height location of a number of spatial positions on a sample defining a height map of a surface through white light interferometry with a broadband light source. The invention also relates to a data carrier, containing digital instructions for performing the white light interferometry.

BACKGROUND

U.S. Pat. No. 5,633,715 describes a method for determining the height location of a number of spatial positions on a sample defining a height map of a surface through white light interferometry with a broadband light source. The method involves for each spatial position on the sample the steps of obtaining a interference pattern signal or correlogram during scanning of the surface in a direction perpendicular to said surface using white light interferometry and estimating the point of the interference pattern signal where the amplitude of the correlogram is at its maximum, thus determining an approximation of the height location of a specific spatial position on the sample represented by said correlogram.

In the apparatus described in U.S. Pat. No. 5,633,715, the estimation of the value where the correlogram reaches its maximum takes place by calculating the center of mass of the derivative of the correlogram. Although this may lead to good results, this method is very sensitive for errors and noise caused by the data gathering process during scanning. The method is a coherence method, rather than a phase method, for determining a height map. The use of the derivative of the correlogram leads to emphasis of high frequency components and hence to amplification of errors.

The coherence methods and apparatus described above provide only a rough approximation of the apex of the correlogram and hence of the height location of a specific spatial position on the sample. In many situations, the height needs to be determined more accurately.

U.S. Pat. No. 5,398,113 discloses the use of phase signal to find a height map. In the method, the phase in Fourier domain is used to determine the height. A zero crossing of the inverse Fourier signal, however, is not used.

U.S. Pat. No. 6,775,006 and U.S. Pat. No. 6,493,093 propose different methods to correct jumps found in height maps calculated from phase data. Both methods use only one phase profile.

SUMMARY

The following presents a simplified summary of the subject invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One object of the invention is to provide a method and apparatus of white light interferometry in which a broadband light source is used to make a height map of an object wherein the abovementioned disadvantages can be avoided. In one aspect of the present invention, the object can be achieved by an estimation of a value where a correlogram has its maximum takes place through subjecting the correlogram to a Fourier transform, subjecting the Fourier transformed signal to a filter, subjecting the filtered signal to an inverse Fourier transform and calculating the centre of mass of this inversed Fourier transformed signal.

In another aspect of the present invention, the object can be achieved by an apparatus wherein a processor is adapted to subject a correlogram to a Fourier transform, subject the Fourier transformed signal to a filter, subject the filtered signal to an inverse Fourier transform and calculate the centre of mass of this inversed Fourier transformed signal.

In yet another aspect of the present invention, the invention relates to an apparatus for determining height locations of a number of spatial positions on a sample defining a height map of a surface through white light interferometry with a broadband light source. The apparatus can include means for positioning an object having the surface to be measured, a broadband white light source, a reference mirror, an optical detector adapted to convert the received light into electrical signals, optical means for directing light from the light source to the surface and to the reference mirror and for directing the light reflected by the reference mirror and reflected by the surface to an optical detector, scanning means for amending at least the optical path difference between the light travelling to and from the reference mirror and to and from the surface and a processing unit, adapted to control the scanning means to perform a scanning action and to receive the signals from the optical detector. The processing unit is adapted to convert the signal received from the optical detector into a correlogram and to estimate the point of the correlogram where the amplitude of the correlogram is at its maximum, thus determining an approximation of the height location of a specific spatial position on the sample represented by said correlogram.

In still yet another aspect of the present invention, the method and the apparatus of the subject invention filter the signal and do not depend on the discrete derivative; thus the invention can be less prone to errors and artifacts. The location of the centre of mass of the filtered signal can be calculated. To obtain a sharper peak or steeper slopes at both sides of the signal of which the centre of mass is calculated, one embodiment of the invention proposes that the magnitude of the inversed filtered Fourier transformed signal can be raised to a power between 1 and 2 inclusive, preferably to the power 1.8, before the centre of mass of said signal is calculated.

In one aspect of the present invention, the subject invention can involve deriving a phase signal representing the phase of the correlogram and determining the value of the height of the zero crossing of said phase signal which is closest to the expected value of the height and also, determining the height values where the phase is equal to $2\pi$ and $-2\pi$, respectively, by finding the zero crossings at the adjacent phase lines. Herein the value of the interference pattern signal can be determined wherein the zero crossing of the phase takes place.

In some instances, use is made of a zero crossing of the phase of the interference pattern signal, which has many of such zero crossings, due to the wrapped nature of the phase calculation. In one embodiment, the zero crossing closest to the expected value of the height as determined in the preceding step can be selected. Herein the expected value of the height can be determined by calculating the centre of mass of the filtered, inversed Fourier transformed correlogram, raised to the power between 1 and 2. According to another embodiment, the number of the image in which the centre of mass is located can be taken as the expected value of the height, leading to an easier and quicker calculation process. It is also possible that this phase method can be applied to other methods for determining the expected value of the height.

In some instances, the phase signal can be derived from the interference pattern. One embodiment proposes to derive the phase signal from the correlogram by subjecting the correlogram to a Fourier transform, subjecting the Fourier transformed signal to a filter which can be adapted to eliminate all the frequencies outside a predetermined frequency range, including zeroing the phase conjugate frequencies and to weigh the frequencies within said range with a factor, subjecting the filtered signal to a inverse Fourier transform and calculating the phase signal from this inversed signal.

In one aspect of the present invention, the filter process eliminates the frequencies of the original correlogram which have no relevance for the determination of the zero crossing of the phase and to weigh the remaining frequencies with a function to emphasize these frequencies. It appears that these features provide a more accurate determination of the zero crossing and hence of the height location of a specific spatial position on the sample than the more general approach as described in the prior art. The function to be used for the weighing of the frequencies can be preferably formed by the function of a Hamming filter. This can provide the best results. However, other filters with similar properties like filters which have a function resembling a half sine wave will also lead to attractive results.

As an alternative to the Fourier transform used in the embodiments described above, it is possible to use other transforms. Accordingly another alternative embodiment proposes to derive the phase signal from the coherence signal by picking a complex wavelet, subjecting the correlogram to said wavelet near the expected value of the height and calculating the phase from this subjected signal.

In some instances, the processes wherein the zero crossing of the phase is determined, either through a Fourier transform or through a wavelet transform will have some inaccuracy, while they will be much more accurate than the rough approximation of the calculation of the centre of mass or other similar processes. This inaccuracy can be attributable to the fact that the phase signal is periodic, that is, it repeats itself every $2\pi$. Hence the phase signal has a zero crossing every $2\pi$. When the centre of mass which is used to select the zero crossing used for the determination of the height deviates from the actual value, for instance as caused by errors during the measuring and scanning process, as may be caused by optical errors and inaccuracies, it cannot be excluded that the 'wrong' zero crossing is selected.

To provide a method excluding this relatively large error, an optional embodiment can provide a process and an apparatus which are adapted to execute the followings: determination of a first height map including the zero crossing, determination of the second and the third height maps including of the $2\pi$ and $-2\pi$ phase crossings, selecting a height map that is calculated from a coherence method, combining the parts of the first height map with the second height map resulting in a profile with a minimal number of jumps, combining the parts of the first height map with the third height map, resulting in a map with a minimal number of jumps and selecting the combined map which is closest to a map calculated from the coherence method.

This method can be based on the fact that the phase may 'jump' between 0, $-2\pi$ and $2\pi$. This method can avoid the attachment to the 'wrong' phase. Herein it makes use of the fact that when the phase 'jumps,' the crossing of 0, $-2\pi$ and $2\pi$ also 'jumps' over $2\pi$. This offers the possibility to construct two continuous maps, of which one is a combination of the 0 and $-2\pi$ crossing, and the other is a combination of the 0 and $2\pi$ crossing. It is noted that this refinement can also be applied to measurement results obtained through other methods, provided that three height maps calculated from the phase and one height maps calculated from a coherence method are available.

The method can be more refined when the selection involves spatially filtering the coherence height map to reduce noise, taking the difference between the filtered coherence height map and the zero-crossing phase height map, taking the difference between the zero-crossing height map and the $2\pi$ or $-2\pi$ crossing height map, determining a set of height maps for a range of predetermined values, wherein a part of the data from the zero-crossing height map can be replaced with the data from the $2\pi$ or $-2\pi$ crossing height map in the same position, the data to be replaced can be at the position where the difference is larger than the predetermined value and the height map from this set that has the minimal number of jumps over the mean difference between the zero-crossing phase height map and the $2\pi$ or $-2\pi$ crossing height map is selected.

This methodology can choose the map closest to the height map calculated earlier by the coherence method. Here, the coherence method is the centre of mass of the inversed filtered Fourier transformed signal. It is noted that this method can be performed as a correction of values obtained through other methods The subject invention can also relate to a data carrier, containing digital instructions for performing the acts as mentioned above.

To the accomplishment of the foregoing and related ends, the invention, then, includes the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
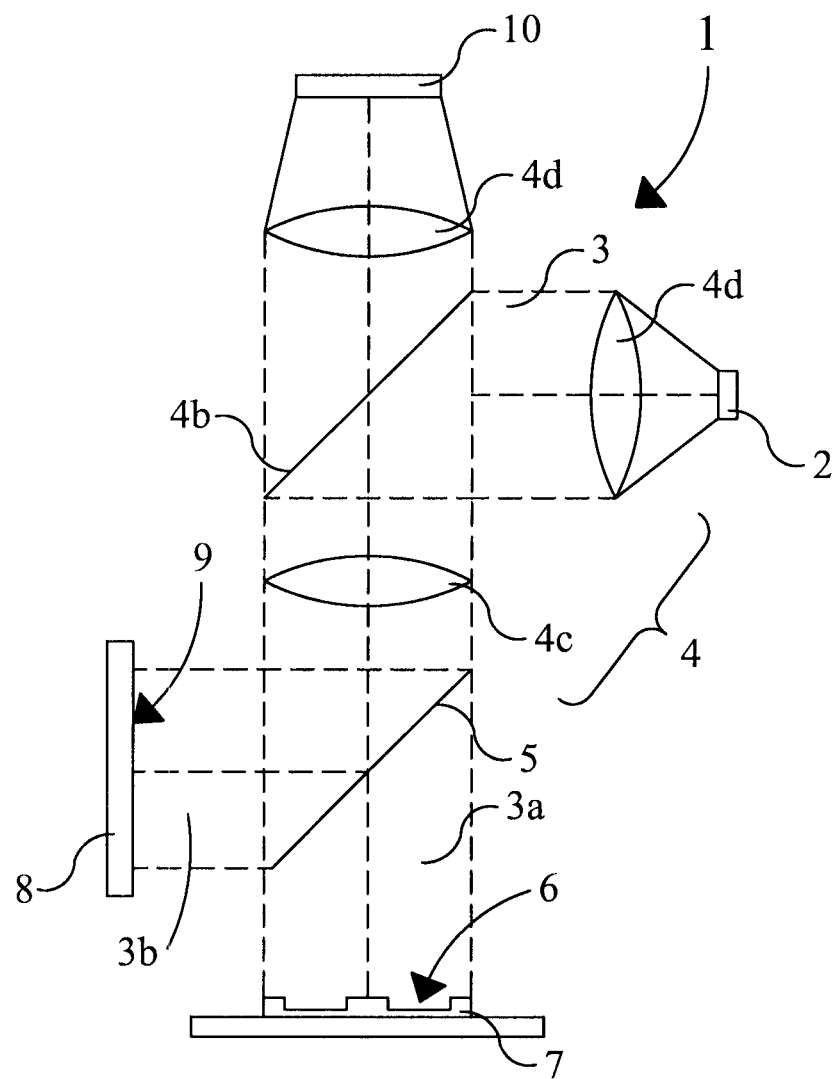
FIG. 1 depicts a functional diagram of the main parts of a white light interferometer.

FIG. 1 shows a white light interferometer 1 which can be used for measuring surface height. The interferometer 1 has a broadband light source 2. Light 3 from the light source 2 is passed through a lens 4a, a beam splitter 4b, and a second lens 4c, typically an objective. After passing through the objective 4c, the light 3 is split by a beam splitter 5 into a first partial beam 3a and a second partial beam 3b. The first partial light beam 3a is directed to a surface 6 of a sample 7 that is fixed relative to the interferometer 1. The second partial light beam 3b is directed to a reference mirror 8 having a reference surface 9. After reflecting by the surfaces 6, 8, respectively, the partial light beams 3a, 3b are combined at the beam splitter 5, passing through the objective 4c, the beam splitter 4b, and the lens system 4d to an imaging device 10. The imaging device can be a CCD array camera 10.

The reference mirror 8 and sample 7 are placed so that their surfaces 6, 9 are in focus on the camera 10. This results in an interference signal on the camera 10. Then, typically the reference surface 9, the beam splitter 5, and the objective 4c are scanned such that the sample moves through the focal (and interference) plane of the objective and the resultant signal on the camera 10 is captured. This scanning can be done with nominally equal step sizes. Also captured can be the location of the scanned reference mirror 9, the beam splitter 5 and the objective 4c, either absolute or relative, during the scanning. The capturing of this location is correlated to the capturing of the signal from the camera 10 so for each location there is a corresponding image. It is noted that the scanning preferably takes place as a continuous movement so that the mechanical dynamic problems with starting and stopping can be avoided. However, it will be appreciated that the camera 10 is read out at discrete steps.

Figure 2:
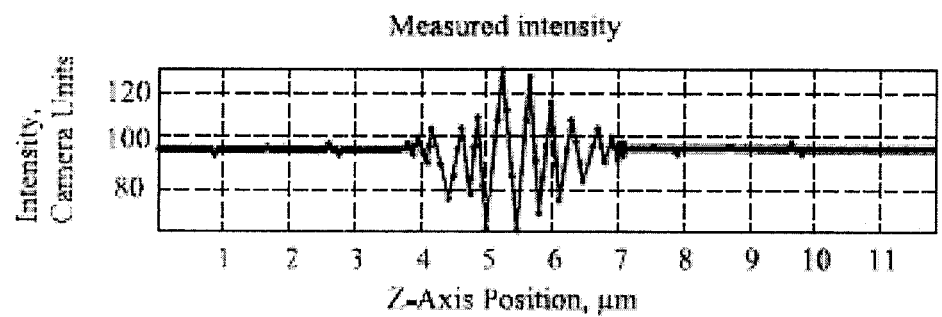
FIG. 2 depicts a diagram of a correlogram as generated by a pixel of an imaging device that is a part of the interferometer as a function of the scanning distance.

Every pixel on the camera 10 corresponds to a spatial position on the sample surface 6 and on the reference surface 9. After the scan, each pixel has an intensity signal where each point corresponds to a location. This intensity signal can have an interference pattern, sometimes called a correlogram. This interference signal is typically thought of as a sum of sinusoidal signals modulated by an envelope function. An example of such a correlogram is depicted in FIG. 2.

One feature of the correlogram is an indication where the optical path difference of the partial light beams 3a and 3b between the reference surface 9 and test surface 6 can be minimized. By determining the location of this maximum for each spatial location of the sample, a height map can be found. This height map will be a combination of the test and reference surfaces 6, 9, but any deviations from a flat in the reference surface 9 are normally considered much smaller than the deviations from a flat 6 in the test surface. Thus, the calculated height map can be considered the measurement of the test surface's deviation from a flat.

In some cases, the signal may need to be pre-processed before it is used to calculate a height map. The preprocessing may include such steps as removing data that occurs outside the correlogram and removing a slope, line, or parabola from the data to eliminate edge effects before the data are processed further. In this embodiment, data outside the main correlogram is discarded and a slope is removed from the remaining data.

The first step of the actual processing can be the determination of the coarse height map, which includes the following steps. First, a Fourier Transform can be applied to the signal. The frequency values of this signal are not found, instead only the frequency indices are required. In the Fourier domain, a filter can be applied. The filter zeros the magnitude and phase of all negative (also known as the phase conjugate) frequency components and the very low frequency components, meaning the first one to two components. The signal can be further filtered by multiplying the frequency component's magnitude by the frequency harmonic number. Then an inverse Fourier transform can be applied on the filtered signal. The absolute value of the resulting signal can be taken and raised to a power n where n is a positive value, preferably between 1 and 2 inclusive, and more preferably about 1.8. The location of the centre of mass of the resultant signal can be the coarse height location. The location of the centre of mass can be the sum of the signal, S times the location, z divided by the sum of the signal. The sum can be taken over the number of images, n. The centre of mass for a signal, S is as follows.

$$CM = \frac{\sum_1^n S*z}{\sum_1^n S}$$

The coarse height map can be taken as an estimate of the surface height of the test object. This method can be quick, but may not be accurate. This centre of mass method may be referred as a coherence method rather than a phase method.

Figure 3:
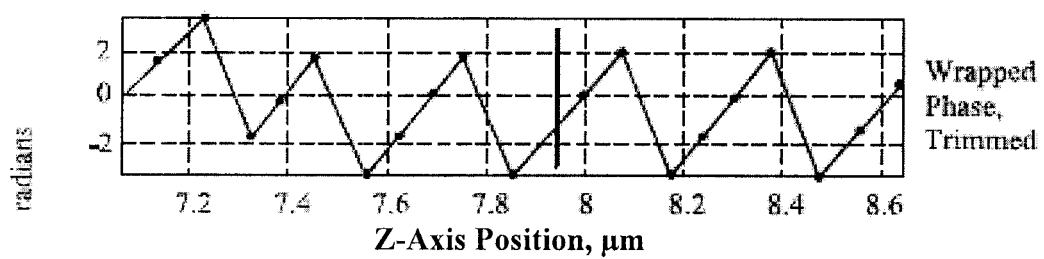
FIG. 3 shows a diagram of a phase of the signal, as a function of the position on the z-axis, still wrapped.

For more accurate methods, the phase of the data can be used. At least two different methods can be implemented to calculate the phase of the data. The first method for calculating the phase involves a Fourier transform. First, a Fourier transform can be applied to the correlogram, just as in the coarse determination as discussed above. In the Fourier domain, a filter can be applied. The filter zeros the magnitude and phase of all non-relevant frequency components (including the phase conjugate frequencies). The signal can be further filtered by multiplying a window function over the relevant frequency components. In this embodiment, a Hamming window can be used as the window function, but other functions can be used. Then an inverse Fourier transform can be applied on the filtered signal. The phase of this signal can be taken. This results in a wrapped phase signal, where the data is phase modulo $2\pi$. Such a wrapped phase signal is depicted in FIG. 3.

The second method for calculating the phase can involve a wavelet transform. Although it is possible to use other complex wavelets, the Morlet wavelet is used in this embodiment. The Morlet wavelet is as follows.

$$MW = conj\left(e^{-\left(\frac{k*ss}{Lw}\right)^2} * e^{i*4*\pi*\sigma_0*k*ss}\right)$$

The parameters of the wavelet are as follows: ss is the step size of the scan (the sampling interval used for data capture); Lw is the wavelet length, here chosen to be $0.5*\lambda 0$; $\sigma 0$ is here $1/\lambda 0$. The mean source effective wavelength is $\lambda 0$, here found by a Fourier analysis of previously acquired data, which changes with each specific measurement setup, depending on the source, the objective's numerical objective, and the sample. The term k is the number of points in the wavelet; it is an integer and varies from $-N$ to $N$, N is 8 here. This term can be used in forming the wavelet. As a final step, the complex conjugate can be taken.

The wavelet can be applied to a single correlogram like a convolution and in this embodiment in the following manner. The wavelet, which has a length of 17 here, can be found. An array of size number points in the correlogram by the same number of points can be formed. The first 17 values of the first row of the array contain the wavelet. The 2nd through 18th values of the second row contain the wavelet. The 3rd through the 19th values of the third row contain the wavelet. This process continues until the wavelet has been stepped through the length of the correlogram. Each row in this array can be then multiplied by the correlogram, forming a new array. The sum along the columns of this new array can be taken. This forms the set of wavelet coefficients for this correlogram. These wavelet coefficients may be complex. The angle of the wavelet coefficients can be a representation of the phase of light at that spatial position on the sample and position. This is a wrapped phase signal, where the data is phase modulo $2\pi$. The result is a signal of the kind as depicted in FIG. 3.

A detail of this method is that the wavelet is actually applied to only a small number of locations near the coarse location. This can be done to save time.

Now that the phase is known, as calculated by either method, a height map based on this phase is found. The coarse location, as found using the image number in the centre of mass method (of the inversed filtered Fourier transformed signal), can be taken as the initial starting point. The location of phase zero-crossing nearest to this coarse location, found through linear interpolation can be chosen as a height location of a specific spatial position on the sample. This location can be also known as the zero crossing. The location where the phase is zero is also shown in FIG. 3.

Also, at this time, the locations at $+2\pi$ and $-2\pi$ crossings are also found. Unwrapping is not required, though. The $+2\pi$ and $-2\pi$ crossings are found through linear interpolation on the adjacent phase lines as shown in FIG. 3. In addition, any integer multiple of the $+2\pi$ and $-2\pi$ crossings can be found by calculating the zero-crossings at the next phase lines.

These zero, $2\pi$, and further crossings can also be found by unwrapping the phase signal around the expected location and finding the crossing by either interpolation or fitting the data to a function and calculating the location.

Figure 4:
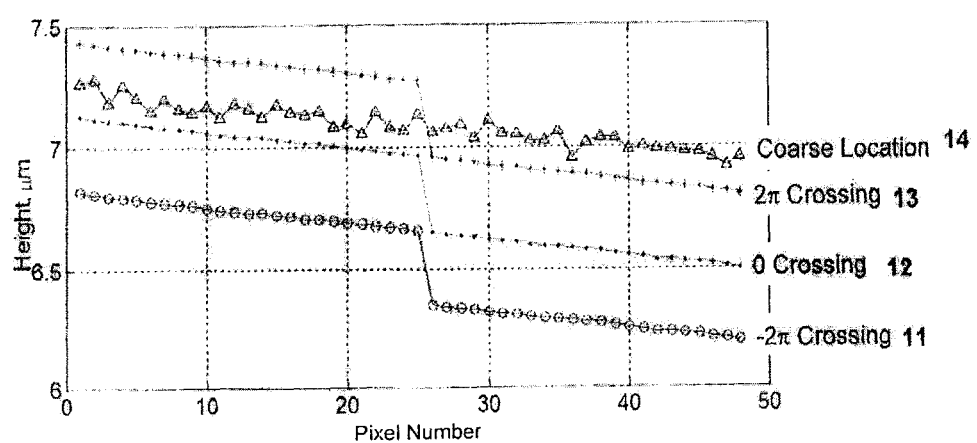
FIG. 4 shows a height map as obtained by a method according to the invention.

When this procedure is done for all spatial positions, three height maps can be found, each resulting from the locations at the $-2\pi$, 0, and $+2\pi$ phase crossings. Profiles from these height maps 11, 12, 13 and a coarse location height map 14 are depicted in FIG. 4. These three height maps 11, 12, 13 and the coarse location height map 14 can be used to correct for bad data. It is noted that the three height maps are actual height maps, in distance units (such as millimeters) rather than phase maps, which have units of radians or degrees. Each height map 11, 12, 13 includes a step or jump dividing each height map in two parts. These steps or jumps are caused by artifacts and errors in the measuring process. Further, it is noted that each part of each of the three height maps has a ramp, which is caused by a ramp in the surface to be measured. Hence this is not an error, but an actual measurement result.

The first initial estimate of the surface height can be the height map found at the zero phase crossing. This height map can be found using the coarse location, which is an estimate of the height found from the coherence data. In practical systems, there can be a mismatch between the heights from the coherence data and from the phase data. This mismatch can be due to various effects including optical distortions, chromatic aberrations, and effects from the sample such as surface slope.

The effect of this mismatch can be jumps in the phase height map of half the effective wavelength. For example, a surface that should be smooth flat has steps of approximately ±300 nm (only for one specific measurement setup). To correct these jumps, the height maps from the $\pm 2\pi$ phase crossings can be used.

The jumps in the zero-crossing height map can be corrected with something like a standard unwrapping algorithm. There are a few difficulties with this method. The absolute value of the corrected height map is not known. A standard unwrapping procedure does not take into account samples that have inherent steps or jumps (that are not due to the phase/coherence mismatch) or missing areas. Missing areas in the height map come from areas with very high slopes where there is no modulation of the light.

The subject invention does not have such difficulties for correcting these jumps. The requirements for this correction procedure are the $-2\pi$, 0, and $+2\pi$ crossing height maps (−2 pHM, 0 HM, +2 pHM, respectively) from the phase data and the coarse height map (found from the centre of mass of the signal after filtering in the Fourier domain).

The subject invention can assume that the jumps span approximately one half of the mean effective wavelength. It is possible that real data has jumps that span two or more levels (where a level is approximately one half of the mean effective wavelength). The principle for correcting data that has jumps that span two or more levels can be the same as shown here; it may need to be repeated for each level that needed correcting. In addition, for each jump level, additional two height maps from phase may be required. Thus to correct 2 jump levels, the $\pm 4\pi$ data are required and to correct 3 jump levels, the $\pm 6\pi$ data are required.

The embodiment here involves a correction of one jump level (one half of the mean effective wavelength). With this starting position, two possible corrected height maps can be created: a combination of the zero crossing and $+2\pi$ crossing height maps (0/+2 pHM) and a combination of the zero crossing and $-2\pi$ crossing height maps (0/−2 pHM). After finding these two possible corrected height maps, the proper one can be selected.

Before finding either possible solution, two initial steps are done. The first step can involve smoothing the coarse height map by a filtering procedure to remove noise and spikes in the data, resulting in CHM. Then a difference height map (DHM) is calculated between the filtered coarse height map and the zero crossing height map, DHM=CHM−0 HM.

Next, the combination of the 0 crossing height map and the $\pm 2\pi$ crossing height map can be found, 0/+2 pHM. First, the absolute value of the mean of the difference between the 0 and $+2\pi$ crossings can be found, MD=|mean(0 HM−+2 pHM)|. This can give an approximate value for one-half the mean effective wavelength and it can be used to calculate a merit function.

A vector of s values can be formed, which can range from −0.7*MD to +0.7*MD and have around 20 values (equally spaced). A set of height maps are calculated using these s values, where each height has a corresponding s value. The basis of each height map can be the 0 crossing height map, 0 HM. Then a specific area of 0 HM can be replaced with the same specific area of the +2 pHM. The specific area that is replaced can be identified as the area where the difference height map, DHM, is larger than the height map's s value. A merit value for each height map can be then found. The merit value is the number of times that the absolute value of the difference between adjacent pixels has a value larger than half of MD.

Thus, for the set of height maps, there are corresponding merit values and s values. The height map in the set that corresponds to the smallest merit value can be determined to be the combination of the 0 and $+2\pi$ crossings, 0/+2 pHM.

The same procedure can be done for the 0 and $-2\pi$ crossing data to result in the combination of the 0 and $-2\pi$ crossings, 0/−2 pHM. Two height maps that have a minimum number of jumps in the data can be obtained. These two height maps can have an offset of the half the mean effective wavelength. The correct height map can be the one that is closest in value to the smoothed coarse height. So, the closest height map can be determined by subtracting CHM from 0/+2 pHM and 0/−2 pHM and taking the absolute value of the mean. The height map that corresponds to the minimum value can be the final corrected height map.

Figure 5:
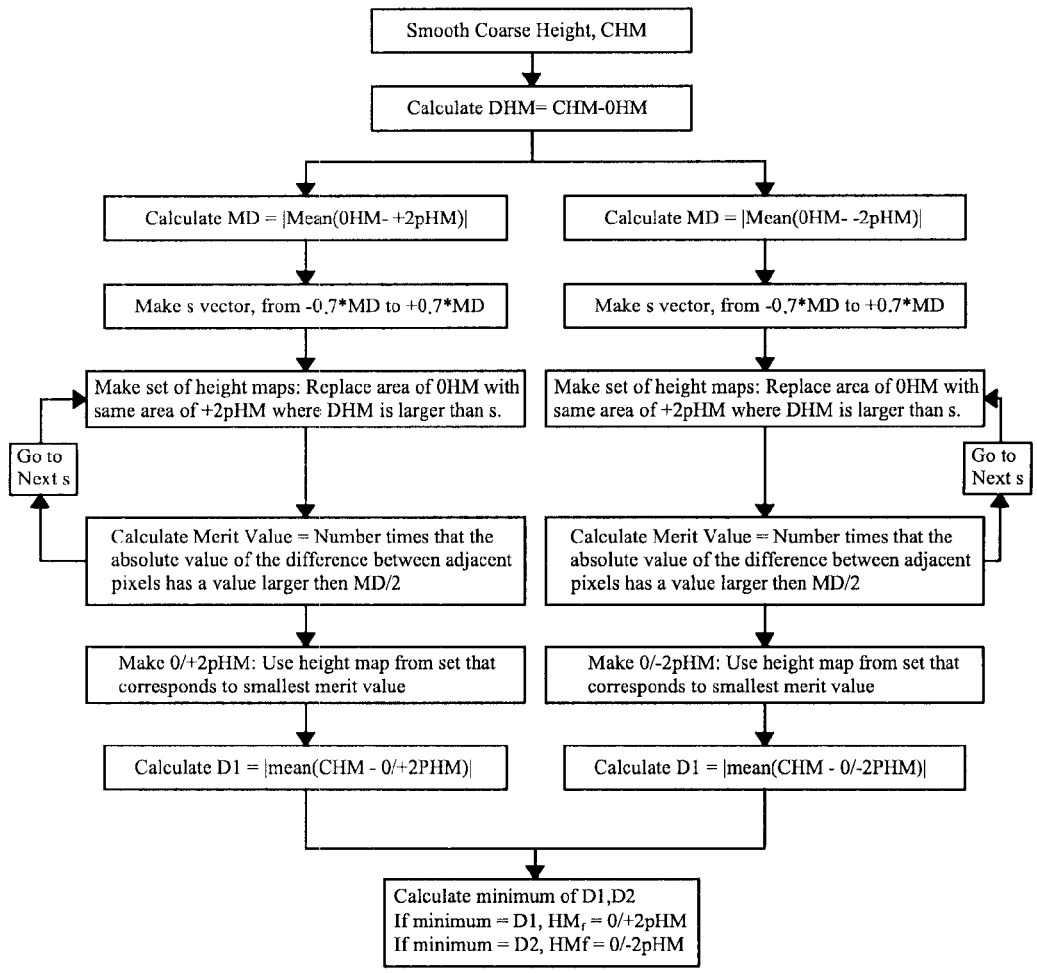
FIG. 5 depicts a flow chart of the steps according to the subject invention.

Further, FIG. 5 shows a diagram wherein the steps of the invention and their mutual relations are shown. Finally, the process discussed above can involve four steps, e.g., a coarse determination step, a first zero crossing step using a Fourier transform, a second zero crossing step using a wavelet transform which is an alternative to the first zero crossing step and a final correction step. Although the best results may be achieved when a combination of the course determination, one of zero crossing steps and the final correction steps is executed, it is noted that the steps may be executed on their own or in combination with other steps not described in this application. It is also possible to combine the coarse determination step with one of the zero crossing steps or to combine one of the zero crossing steps with the final step.

What has been described above includes examples of the subject invention It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain," "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain," "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. A method for determining the height of a number of spatial positions on a sample defining a height map of a surface through white light interferometry with a broadband light source, comprising for each spatial position:
obtaining a correlogram during scanning of the surface through a focal plane of an objective using white light interferometry; and
estimating the point of the correlogram where an amplitude of the correlogram is at its maximum, thus determining an approximation of the height of the spatial position on the sample represented by said correlogram,
wherein estimating the point of the correlogram where the amplitude of the correlogram is at its maximum comprises:
subjecting the correlogram to a Fourier transform;
subjecting the Fourier transformed signal to a filter;
subjecting the filtered signal to an inverse Fourier transform; and
calculating the location of the centre of mass of the inversed filtered Fourier transformed signal.

2. The method of claim 1, wherein the magnitude of the inversed Fourier transformed signal is raised to a power between 1 and 2 inclusive before the centre of mass of said signal is calculated.

3. The method of claim 1 further comprising:
deriving a phase signal representing the phase of the correlogram;
determining the value of the height of the zero crossing of said phase signal closest to an expected value of the height; and
determining the value of the height of an integer multiple of the $2\pi$ and $-2\pi$ crossings by determining the zero crossing of the integer multiple adjacent phase lines.

4. The method of claim 3, wherein the expected value is calculated by taking the number of the image that is closest to where the centre of mass is located.

5. The method of claim 3, wherein deriving the phase signal from the correlogram comprises:
subjecting the correlogram to a Fourier transform;
subjecting the Fourier transformed signal to a filter which is adapted to eliminate all the frequencies outside a predetermined frequency range and to weigh the frequencies within said range with a function;
taking the inverse Fourier transform of the filtered signal; and
calculating the phase signal from the inversed Fourier transform of the filtered signal.

6. The method of claim 5, wherein the frequencies within the predetermined range are weighed with a filter.

7. The method of claim 3, wherein deriving the phase signal from the correlogram comprises:
picking a complex wavelet;
subjecting the correlogram to said wavelet near the expected value of the height; and
calculating the phase from the subjected signal.

8. The method of claim 5 further comprising:
determination of a first height map comprising the zero crossing;
determination of the second and the third height maps comprising the $2\pi$ and $-2\pi$ crossings in the phase signal;
selecting a height map that is calculated from a coherence method;
combining the parts of the first height map with the second height map resulting in a map with a minimal number of jumps;
combining the parts of the first height map with the third height map, resulting in a map with a minimal number of jumps; and
selecting the combined map which is closest to the height map as calculated using a coherence method.

9. The method of claim 8, wherein selecting the combined map comprises:
spatially filtering the coherence height map to reduce noise;
taking the difference between the filtered coherence height map and the first height map;
taking the difference between the first height map and the second and third height maps respectively;
determining a set of height profiles for a range of predetermined values,
wherein a part of the data from the first height map is replaced with the data from the second or third height map in the same position;
the data to be replaced is at the position where the difference between the first height map and the second or third height maps is larger than the predetermined value; and
the height map from the set that has the minimal number of jumps over half the mean difference between the first height map and the second or third height map is selected.

10. An apparatus for determining the height location of a number of spatial positions on a sample defining a height map of a surface through white light interferometry with a broadband light source, the apparatus comprising:
- means for positioning an object having a surface to be measured;
- a broadband white light source;
- a reference mirror;
- an optical detector adapted to convert the received light into electrical signals;
- optical means for directing light from the light source to the surface and to the reference mirror and for directing the light reflected by the mirror and reflected by the surface to the optical detector;
- scanning means for amending at least the distance of the optical paths between the surface and reference mirror; and
- a processing unit adapted to control the scanning means to perform a scanning action and to receive the signals from the optical detector, wherein the processing unit is adapted to convert the signal received from the optical detector into a correlogram and to estimate the point of the correlogram where an amplitude of the correlogram is at its maximum, thus determining an approximation of the height of the spatial position on the sample represented by said correlogram, wherein the processor is adapted to subject the correlogram to a Fourier transform, subject the Fourier transformed signal to a filter, subject the filtered signal to an inverse Fourier transform, and calculate the location of the centre of mass of the inversed Fourier transformed signal.

11. The apparatus of claim 10, wherein the processor is adapted to derive a phase signal representing the phase of the correlogram, determine the value of the height of the zero crossing of said phase signal closest to an expected value of the height and determine the value of the height of an integer multiple of the $2\pi$ and $-2\pi$ crossings by determining the zero crossing of the integer multiple adjacent phase lines.

12. The apparatus of claim 10, wherein the processor is adapted to derive the phase signal from the correlogram by the following acts:
- subjecting the correlogram to a Fourier transform;
- subjecting the Fourier transformed signal to a filter which is adapted to eliminate all the frequencies outside a predetermined frequency range and to weigh the frequencies within said range with a factor;
- subjected the filtered signal to an inverse Fourier transform; and
- calculating the phase signal from the inversed filtered Fourier transformed signal.

13. The apparatus of claim 10, wherein the processor is adapted to derive the phase signal from the correlogram by the following acts:
- picking a complex wavelet;
- subjecting the correlogram to said wavelet near an expected value of the height; and
- calculating the phase from the subjected signal.

14. The apparatus of claim 12, wherein the apparatus is adapted to perform the following acts:
- determining a first height map comprising the zero crossing;
- determining the second and the third height maps comprising the $2\pi$ and $-2\pi$ crossings in the phase signal;
- selecting a height map that is calculated from a coherence method;
- combining the parts of the first height map with the second height map resulting in a map with a minimal number of jumps;
- combining the parts of the first height map with the third height map resulting in a map with a minimal number of jumps; and
- selecting the combined map which is closest to the height map as calculated using a coherence method.

15. The apparatus of claim 14, wherein selecting the combined map comprises:
- spatially filtering the coherence height map to reduce noise;
- taking the difference between the filtered coherence height map and the first height map;
- taking the difference between the zero-crossing phase height map and the second or third height map; and
- determining a set of height profiles for a range of predetermined values,
- wherein a part of the data from the first height map is replaced with the data from the second or third height map in the same position;
- the data to be replaced is at the position where the difference between the first height map and the second or third height map is larger than the predetermined value; and
- the height map from the set that has the minimal number of jumps over half the mean difference between the first height map and the second or third height map is selected.

* * * * *